United States Patent [19]
Orillon et al.

[11] Patent Number: 5,804,045
[45] Date of Patent: Sep. 8, 1998

[54] CATHODE FOR REDUCTION OF CARBON DIOXIDE AND METHOD FOR MANUFACTURING SUCH A CATHODE

[75] Inventors: Marc Orillon, La Crau; Sylvie Chardon-Noblat, Echirolles; Marie Noëlle Colomb-Dunand Sauthier, La Tronche; Alain Deronzier, Meylan; Raymond Ziessel, Souffelweyersheim; Daniela Zsoldos, Noyarey, all of France

[73] Assignee: Etat Francais as represented by Delegation Generale Pour L'Armement, Armees, France

[21] Appl. No.: 839,311

[22] Filed: Apr. 18, 1997

[30] Foreign Application Priority Data

Apr. 18, 1996 [FR] France .................................. 96.04840

[51] Int. Cl.$^6$ ..................................................... C25B 11/00
[52] U.S. Cl. ........................... 204/280; 204/291; 204/292
[58] Field of Search ................................. 556/42, 56, 51, 556/136, 137; 204/280, 291, 292; 548/101, 109

[56] References Cited

U.S. PATENT DOCUMENTS

| | | | |
|---|---|---|---|
| 4,756,807 | 7/1988 | Meyer et al. | 204/59 R |
| 5,238,808 | 8/1993 | Bard et al. | 548/109 |
| 5,284,563 | 2/1994 | Fujihira et al. | 204/252 |
| 5,393,903 | 2/1995 | Grätzel et al. | 556/137 |
| 5,580,527 | 12/1996 | Bell et al. | 422/82.07 |

OTHER PUBLICATIONS

Journal of the American Chemical Society 1977, 99, 7094, T.J. Meyer et al. No month available.
Journal of Organometallic Chemistry 1993, 444, 191, M.N. Colomb–Dunand–Sauther et al. No month available.
Journal of Physical Chemistry 1993, 97, 5973, M.N. Colomb–Dunand–Sauthier et al. No month available.
Journal of Chemical Society, Chem. Commun., 1987, pp. 131–132., Hitoshi Ishida et al. No month available.
Journal of Molecular Catalysis 1988, vol. 45, pp. 381–391, S. Cosnier et al. No month available.

*Primary Examiner*—Bruce F. Bell
*Attorney, Agent, or Firm*—Oliff & Berridge, PLC

[57] ABSTRACT

The invention relates to a cathode based on a transition metal (M) for reduction of carbon dioxide into formate in a hydro-organic or purely aqueous medium, particularly for air decarbonation applications for industry and in general for atmospheric pollution control and regeneration of breathable air in a confined or unconfined environment, characterized by including a transition metal molecular complex formed of:

a bidentate ligand functional by identical or different electroattractive groups A and A', the ligand comprising a basic molecular group allowing the reduction redox potential of the complex to be reduced in a range of −1.40 to +0.80 V relative to an Ag/Ag$^+$ reference electrode, at least one of the groups A or A' being electropolymerizable;

two identical or different labile groups Y and Y' with trans stereochemistry taken from the following series: halide anion (Cl$^-$, Br$^-$, I$^-$), acetate anion (CH$_3$COO$^-$), neutral acetonitrile or dimethylformamide or dimethylsulfoxide molecule;

two identical or different stabilizing ligands Z and Z' with cis stereochemistry, representing a donor and attractor group of the carbonyl (—CO) or phosphine type (PR$_3$ with R=alkyl, aryl, pyridine);

the complex having the structure of Formula (I).

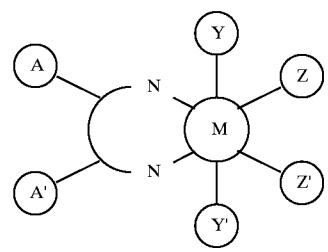

12 Claims, No Drawings

CATHODE FOR REDUCTION OF CARBON DIOXIDE AND METHOD FOR MANUFACTURING SUCH A CATHODE

BACKGROUND OF THE INVENTION

The invention relates to cathodes used for carbon dioxide reduction, applied in air decarbonation processes for industry, and in general in atmospheric pollution control systems and breathable air regeneration systems, whether or not in a confined environment.

The electrodes classically used are solid copper, molybdenum, or ruthenium electrodes. The latter have the major drawback of extremely rapid passivation, thus requiring surface cleaning sequences (mechanical or electrochemical cleaning). These electrodes have another drawback: they are not selective in the carbon dioxide electrochemical reduction process; a number of substances are formed, including corrosive substances and gases. Electrodes modified by transition metal complexes (rhenium, ruthenium, or nickel) grafted at the surface have also been developed but, despite high Farad yields and electrolysis potentials on the order of −1.2 to −1.5 V relative to the saturated calomel electrode, carbon dioxide reduction competes with reduction of water into hydrogen.

The gaps in or major drawbacks of prior designs reside in the lack of selectivity, stability, and efficiency of the solid or modified electrodes.

In order to reduce overvoltages and increase reduction selectivity, electrodes have been modified by a ruthenium polymer obtained electrochemically. They allow quantitative reduction of carbon dioxide at an electrode potential of approximately −1.2 V relative to a saturated calomel electrode and in a purely aqueous medium, but the reduction product is essentially carbon monoxide.

SUMMARY OF THE INVENTION

The goal of the invention is to develop a novel type of cathode modified by organomineral polymers that have very good adhesion to the electrode and very good electrochemical and chemical stability as well as optimum efficiency regarding electrochemical reduction of the carbon dioxide to formate. The absence of gas (carbon monoxide or hydrogen) formation is also one of the major goals of the invention.

Hence the invention relates to a cathode based on a transition metal (M) for reduction of carbon dioxide into formate in a hydro-organic or purely aqueous medium, particularly for industrial applications of air decarbonation and in general for atmospheric pollution control and regeneration of breathable air in a confined or unconfined environment, characterized by including a transition metal molecular complex formed of:
  a bidentate ligand functionalized by identical or different electroattractive groups A and A' comprising a basic molecular group allowing the reduction redox potential of the complex to be reduced in a range of −1.40 to +0.80 V relative to an $Ag/Ag^+$ reference electrode, at least one of the groups A or A' being electropolymerizable;
  two identical or different labile groups Y and Y' with trans stereochemistry taken from the following series: halide anion ($Cl^-$, $Br^-$, $I^-$), acetate anion ($CH_3COO^-$), neutral acetonitrile, dimethylformamide or dimethylsulfoxide molecule;
  two identical or different stabilizing ligands Z and Z' with cis stereochemistry, representing a σ-donor and π-attractor group of the carbonyl type (—CO) or phosphine ($PR_3$ with R=alkyl, aryl, pyridine);

the complex having the structure of Formula (I) (see below) and being modified by a polymer film obtained by formation of metal-metal bonds. Formula (I) is depicted below:

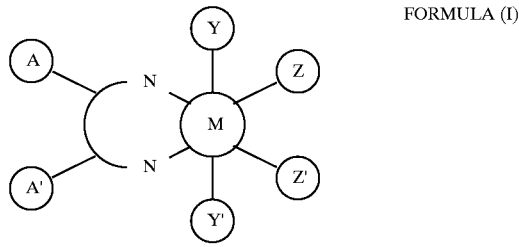

FORMULA (I)

The Y, Y', Z, and Z' groups are monodentate.

When the Y and Y' groups are neutral solvent molecules, the complexes are double-charged.

The Z and Z' groups according to the invention must be good σ-donor and π-acceptor ligands capable of stabilizing the metal in different degrees of oxidation.

DETAILED DESCRIPTION OF THE PREFERRED EMBODIMENTS

The usefulness of these novel electrodes resides in their exceptional electrocatalytic activity for reduction of carbon dioxide into formate and their utilization for developing purifiers and regenerators of confined atmospheres.

Preferably, the chelated ligand has a basic molecular group chosen from 2,2'-bipyridines, 1,10-phenanthrolines, bipyrimidines, bi-isoquinolines, and biquinolines.

Still more preferably the metal atom is ruthenium.

The A and A' groups are chosen from the following list: —COOH, —COOR, —$NO_2$, —CH=$C(CN)_2$, —C≡CH, —$O(CH_2)_2CN$, —$CONR_2$, substituted or nonsubstituted aryl, with R=hydrocarbon chain, possibly interrupted by one or more heteroatoms and having 1 to 10 carbon atoms.

They can be constituted by the —COOR group, with R=isopropyl ester, 3-pyrrole-1-yl-propyloxycarbonyl, 3-thiophene-1-yl-propyloxycarbonyl. For example, in the first case, the cathode has the structure with Formula (II). Formula (II) is depicted below:

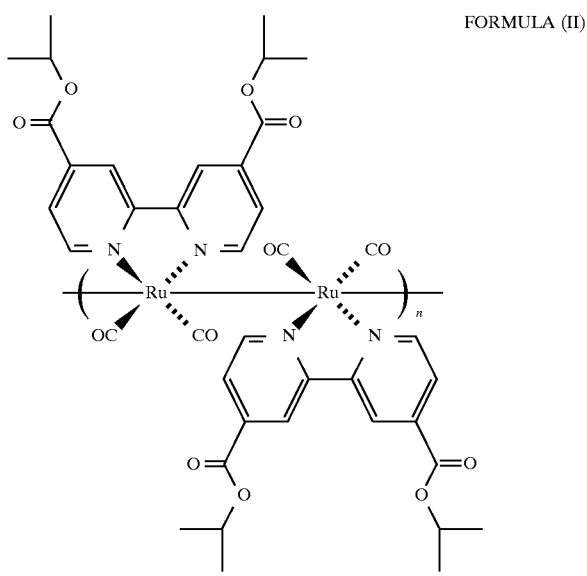

FORMULA (II)

Further, for example, in the second case, it has the structure with Formula (III). Formula (III) is depicted below:

The invention also relates to a method of manufacturing these electrodes characterized by the polymer film being obtained by electrosynthesis in acetonitrile ($CH_3CN$) or dimethylsulfoxide (DMSO).

In the embodiment relating to Formula (II), the organomineral polymer film is obtained on carbon felts at the potential of −1.20 V relative to an $Ag/Ag^+$ reference electrode from a solution of the $C_1$ complex. The $C_1$ complex is depicted below:

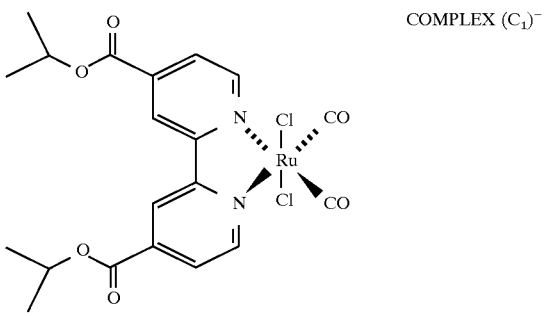

COMPLEX $(C_1)^-$

In the embodiment relative to Formula (III), the polymer film is based on polypyrrole and preformed by oxidizing a

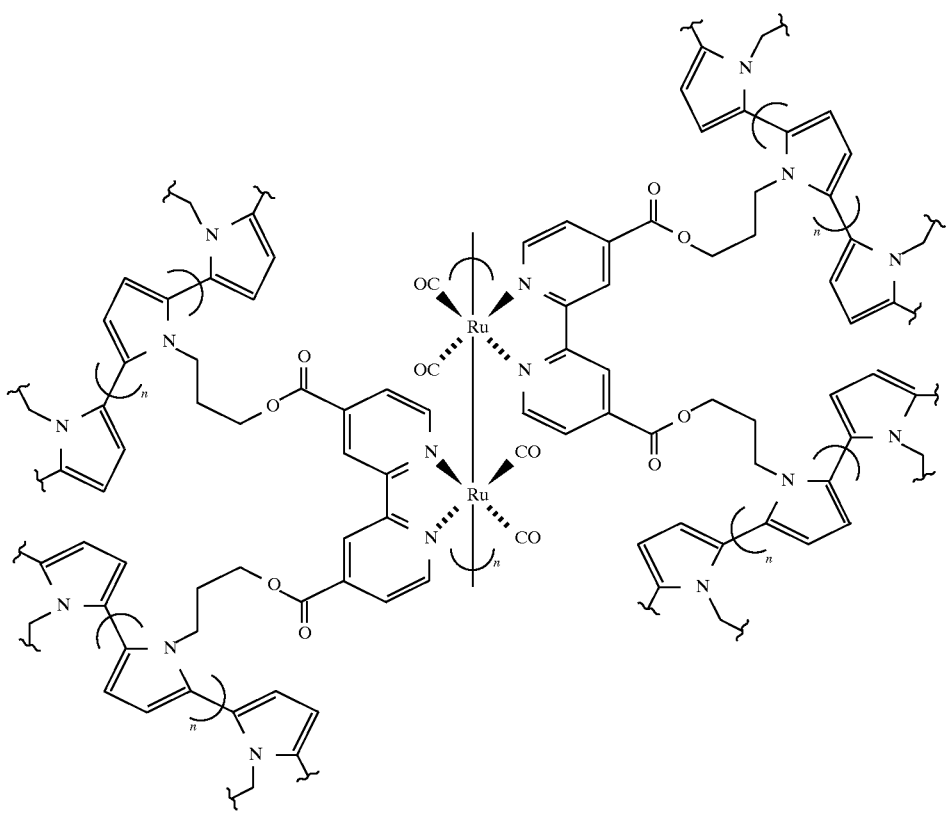

FORMULA (III)

In one alternative embodiment, the cathode has metal islands disposed in the polymer.

The use of such metal islands dispersed in the organomineral polymer favors transfers of electrons and protons while increasing current densities and orienting the selectivity of the reduction to substances other than formates such as formaldehyde or methanol.

solution of the $C_2$ (see below) complex at the potential of +0.85 V relative to an $Ag/Ag^+$ reference electrode or by successive scanning of potentials between −0.2 V and +0.8 V relative to an $Ag/Ag^+$ reference electrode. The $C_2$ complex is depicted below:

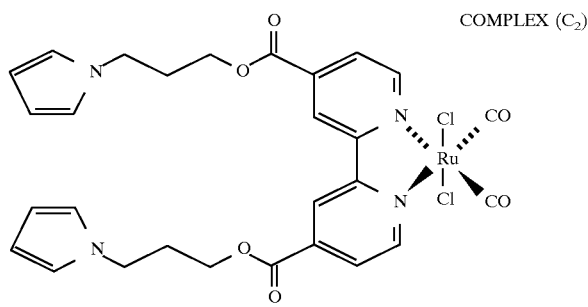

COMPLEX (C₂)

The invention will be better understood with the aid of the two examples presented below which are not limiting in nature.

The molecular cathodes modified by a polymer film according to the invention are obtained by an electrochemical process from precursor metal complexes containing an electron acceptor ligand (ester group or pyrrole ester) according to Formula (I).

EXAMPLES

Example 1
Cathode Modified by a Polymer Film Known as a First-Generation Polymer Film

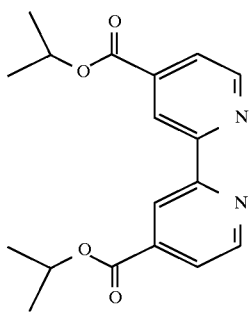

LIGAND (L₁)

Ligand $L_1$=4,4'-A,A'-2,2'-bipyridine with A=A'= isopropylester is prepared according to a known experimental method described in the article by T. J. Meyer et al. in the Journal of the American Chemical Society 1977, 99, 7094.

The trans-(Cl)-[Ru($L_1$)(CO)$_2$Cl$_2$] complex (Formula $C_1$) was prepared by the techniques described in the article by M. -N. Collomb-Dunand-Sauthier et al. in the Journal of Organometallic Chemistry 1993, 444, 191.

A first type of polymer film known as first-generation polymer film is prepared quantitatively by electrosynthesis from a solution of this $2\times10^{-3}$ molar complex $C_1$ in acetonitrile to which a 0.1 molar solution of tetrabutylammonium perchlorate (TBAP) has been added and obtained on carbon felts measuring 1×1×0.4 cm at the potential of −1.20 V relative to an Ag/Ag⁺ reference electrode. The quantity of polymer deposited is monitored by coulometry. When the charge used is approximately 1 Coulomb, the estimated electroactive surface is approximately 21 cm². The quantity of complex deposited under these conditions is $2.6\times10^{-7}$ mole/cm².

The polymer structure is obtained by formation of metal-metal bonds and has the structure of Formula (II).

The electrodes obtained after rinsing with acetonitrile are transferred either to an aqueous medium buffered to a pH of 5 to 12 or to a medium containing potassium (KOH) at a 1 molar concentration, sodium sulfate (Na$_2$SO$_4$) at a 0.1 molar concentration being the electrolyte.

Electrolysis under a carbon dioxide atmosphere is conducted in an aqueous medium at the potential of −1.20 V relative to an Ag/AgCl reference electrode. For an initial solution at pH=12, the formate yield is 90% and only 9% carbon monoxide is obtained in the form of a by-product. In general, this electrode has excellent catalytic properties with quantitative electrical yields.

Example 2
Cathode Modified by a Polymer Film Known as a Second-Generation Polymer Film

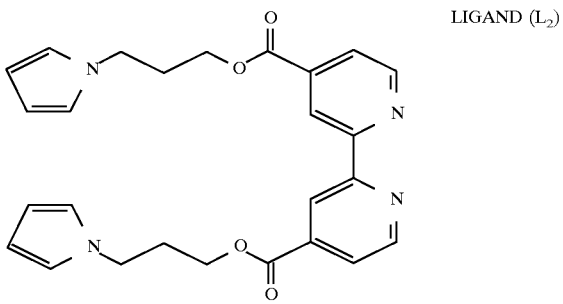

LIGAND (L₂)

Ligand $L_2$=4,4'-A,A'-2,2'-bipyridine with A=A'=3-pyrrole-1-ylpropyloxycarbonyl is prepared according to a known experimental method described in the article by S. Cosnier et al. in the Journal of Molecular Catalysis 1988, 45, 381.

The trans-(Cl)-[Ru($L_2$)(CO)$_2$Cl$_2$] complex (Formula $C_2$) was prepared by the techniques described in the article by M. -N. Collomb-Dunand-Sauthier et al. in the Journal of Physical Chemistry 1993, 97, 5973.

A second type of polymer film known as second-generation polymer film is prepared quantitatively by electrosynthesis in an acetonitrile to which TBAP in a 0.1 molar concentration has been added and obtained on carbon felts measuring 1×1×0.4 cm by oxidation at the controlled potential of +0.85 V relative to an Ag/Ag⁺ reference electrode or by successive potential scanning between −0.2 V and +0.8 V relative to an Ag/Ag⁺ reference electrode of a $2\times10^{-3}$ molar solution of the $C_2$ complex.

The electropolymerization yields are approximately 30%, corresponding to surface concentrations of complexes between $4\times10^{-8}$ and $6.1\times10^{-8}$ mole/cm².

The polymer structure is obtained in the first step by polymerization of pyrrole and in the second step by formation of metal-metal bonds during utilization to reduce the carbon dioxide. It has the structure of Formula (III).

Electrolysis under a carbon dioxide atmosphere is conducted in an aqueous medium at the potential of −1.20 V relative to an Ag/AgCl reference electrode. The formate yield obtained with such an electrode at pH=12 (phosphate buffer) attains 78% while the carbon monoxide yield is 12%. When electrolysis is conducted over a long period of time, the catalytic current remains fully stable, evidencing the excellent electrochemical stability of the material.

In the systems studied taken as a whole, the absence of hydrogen formation makes them particularly appropriate for specific applications.

In other embodiments, other transition metal complexes, particularly those with two labile bonds in the trans position, whose metal would be rhodium, osmium, chromium, or nickel, can be used.

All references and patents cited herein are incorporated by references in their entirety into this patent application.

What is claimed is:

1. A cathode based on a transition metal, M, for reduction of carbon dioxide into formate in a hydro-organic or purely aqueous medium comprising:
   a transition metal molecular complex further comprising:
   a bidentate ligand functionalized by identical or different electroattractive groups A and A', said ligand comprising a basic molecular group allowing the reduction redox potential of the complex to be reduced in a range of −1.40 to +0.80 V relative to an Ag/Ag⁺ reference electrode, at least one of the groups A or A' being electropolymerizable;
   two identical or different labile groups Y and Y' with trans stereochemistry which are selected from the group consisting of a halide anion selected from Cl⁻, Br⁻, and I⁻, an acetate anion (CH₃COO⁻), a neutral acetonitrile, a dimethylformamide molecule and a dimethylsulfoxide molecule;
   two identical or different stabilizing ligands Z and Z' with cis stereochemistry, representing a donor and attractor group of the carbonyl (—CO), or phosphine (PR₃), wherein R=alkyl, aryl, or pyridine;
   wherein the complex has the following general Formula (I):

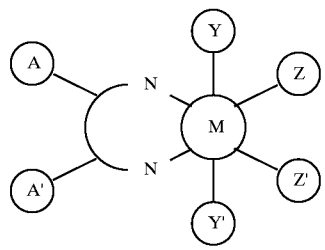

and wherein the complex is modified by a polymer film obtained electrochemically by formation of metal—metal bonds.

2. The cathode of claim 1, wherein the basic molecular group is at least one member selected from the group consisting of 2,2'-bipyridines, 1,10-phenanthrolines, bipyrimidines, bi-isoquinolines, and biquinolines.

3. The cathode of claim 1, wherein the metal atom is ruthenium.

4. The cathode of claim 1, wherein A and A' are independently members selected from the group consisting of:

—COOH, —COOR, —NO₂, —CH═C(CN)₂, —C≡CH, —O(CH₂)₂CN, —CONR₂, substituted aryl, and nonsubstituted aryl, wherein R is a C₁–C₁₀ hydrocarbon chain, optionally interrupted by one or more heteroatoms.

5. The cathode of claim 4, wherein said hydrocarbon chain is interrupted by one or more of said heteroatoms.

6. The cathode of claim 4, wherein A and A' are independently —COOR wherein R=isopropylester, 3-pyrrole-20 1-yl-propyloxycarbonyl, or 3-thiophene-1-yl-propyloxycarbonyl.

7. The cathode of claim 6, wherein the complex comprises the following Formula (II):

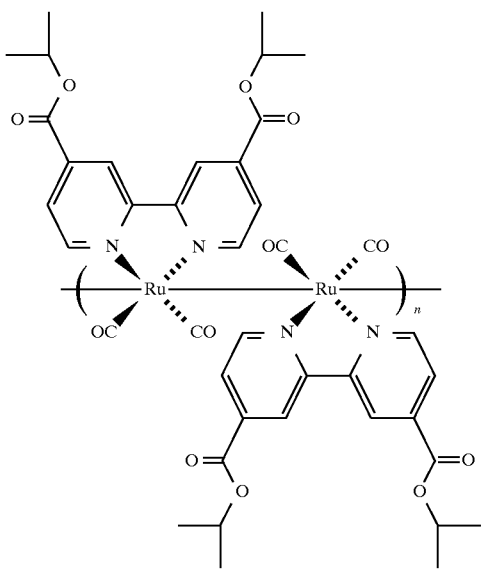

8. The cathode of claim 6, wherein the complex comprises the following Formula (III):

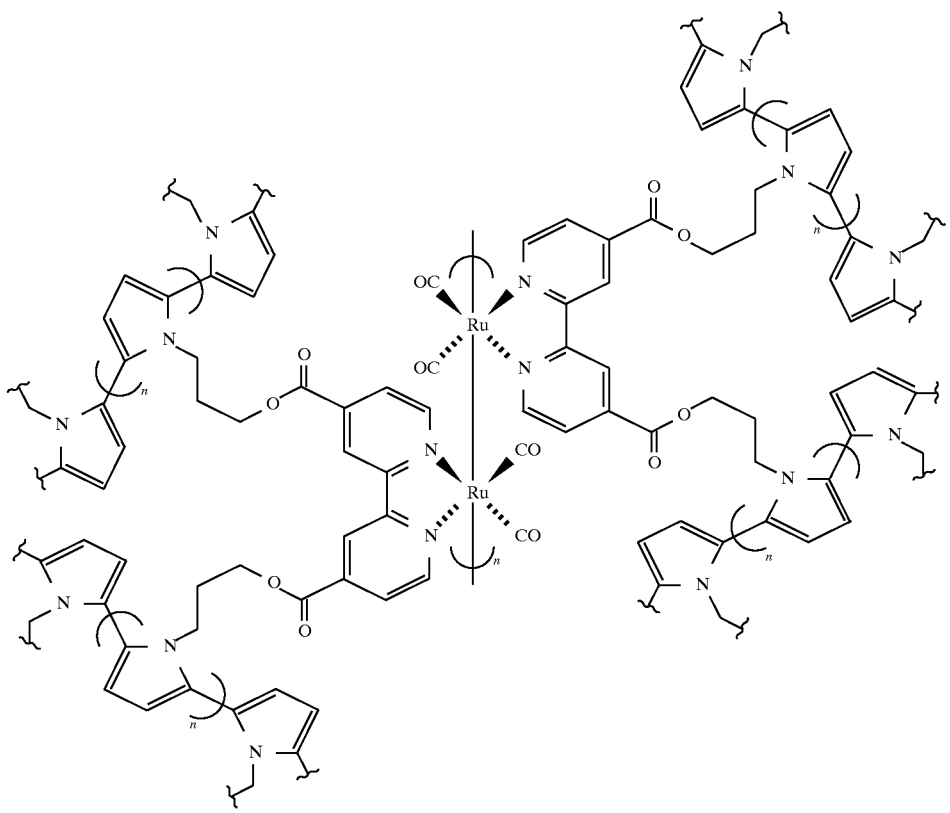

9. A method for manufacturing the cathode of claim 6, wherein the polymer film is preformed by oxidation of a dipropyloxypyrrole solution at a potential of +0.85 V relative to an Ag/Ag$^+$ reference electrode or by successive potential scanning between −0.2 V and +0.8 V relative to an Ag/Ag$^+$ reference electrode.

10. A method for manufacturing the cathode of claim 4, wherein the polymer film is obtained on carbon felt with a potential of −1.20 V relative to an Ag/Ag$^+$ reference electrode.

11. The cathode of claim 1, wherein said metal forms islands dispersed in the polymer.

12. A method for manufacturing the cathode of claim 1, wherein the polymer film is obtained or preformed by electrosynthesis in acetonitrile.

* * * * *